United States Patent [19]
Jenkinson

[11] 3,982,850
[45] Sept. 28, 1976

[54] MATCHING DIFFERENTIAL THERMAL EXPANSIONS OF COMPONENTS IN HEAT ENGINES

[75] Inventor: John Jenkinson, Bristol, England

[73] Assignee: Rolls-Royce (1971) Limited, Great Britain

[22] Filed: June 16, 1975

[21] Appl. No.: 587,168

[30] Foreign Application Priority Data
June 29, 1974 United Kingdom............... 28997/74

[52] U.S. Cl.............................. 415/178; 60/39.32; 415/136
[51] Int. Cl.² .......................................... F01D 5/00
[58] Field of Search............... 415/212 R, 178, 115, 415/116, 117, 139, 136; 60/39.32, 200 A; 277/26

[56] References Cited
UNITED STATES PATENTS

| | | | |
|---|---|---|---|
| 2,799,472 | 7/1957 | Rainbow | 415/136 |
| 3,085,398 | 4/1963 | Ingleson | 60/39.32 |
| 3,250,512 | 5/1966 | Petrie | 415/136 |
| 3,321,179 | 5/1967 | Johnson et al. | 415/136 |
| 3,527,053 | 9/1970 | Horn | 60/39.32 |
| 3,736,751 | 6/1973 | Rodney | 277/26 |
| 3,840,332 | 10/1974 | Smith | 60/39.32 |

FOREIGN PATENTS OR APPLICATIONS

629,283 10/1961 Canada............................. 415/139

Primary Examiner—Henry F. Raduazo
Attorney, Agent, or Firm—Stevens, Davis, Miller & Mosher

[57] ABSTRACT

Thermal matching of compounds in a gas turbine engine is achieved by providing the component with the highest rate of thermal expansion with an insulating sheet which is dimpled to contact the surface of the component at discrete spots leaving air spaces in between. The sheet is attached to the component by spot welding at a pre-determined number of areas to provide the necessary heat conducting paths between the insulation and the component to enable the expansion of the component to be matched with that of another component. Seal clearances can be reduced by matching the expansions of seal carrying components in this way.

7 Claims, 4 Drawing Figures

MATCHING DIFFERENTIAL THERMAL EXPANSIONS OF COMPONENTS IN HEAT ENGINES

This invention concerns the matching of differential thermal expansions of components of a heat engine and more particularly relates to the provision of a degree of heat insulation to a portion of a gas turbine engine.

Gas turbine rotors generally have gas pressure seals which for reasons of mechanical reliability are simply air gaps between the rotor and the various static parts of the engine. Where such a seal is formed between a rotor, which is made thick to withstand the stresses of rotation, and a stator made thin for reason of engine weight, a large leakage gap is necessary to accommodate the different rates of expansion and contraction, occurring during engine acceleration and deceleration, of these two widely differing thermal masses. The resulting high leakage rates have deleterious effects on engine efficiency.

An object of the present invention is to provide a degree of thermal matching between components of a gas turbine engine by which means the differential expansions of the components are reduced.

According to the present invention in a heat engine having two components of different thermal masses disposed in the same environment and which expand at different rates, there is provided insulation over an area of at least one surface of the component of lower thermal mass the size of said area being such in relation to the thermal conduitivity of the insulation, the temperature in the environment and the rate of thermal expansion of the other component, as to allow only sufficient heat conduction between the insulation and said component as to reduce the rate of thermal expansion and contraction of said component to more nearly match that of the other component.

The insulation may be in the form of a sheet, spaced from the component but connected to it at a plurality of discrete areas distributed over the insulated area, the number and sizes of the discrete areas being such as to define the required heat conducting paths between the insulation and the component.

In a preferred form the insulation comprises a sheet of material over at least one surface of which is provided a plurality of depressions or cavities such that when the sheet is attached to the component to be insulated at least some of the depressions or cavities provide the spacing between the sheet and the component, the sheet being secured to said component at locations between the depressions or cavities.

In one form of the invention the insulation is in the form of a thin dimpled sheet which may comprise a metallic foil and which is secured to the component to be insulated by spot welding.

Alternatively the sheet may be perforated.

By suitable choice of size of cavities or depressions, the area of spot welds and frequency of welds, the heat transfer between the sheet member and the member to be insulated may be adjusted or maintained within a predetermined value.

In one embodiment of the invention the sheet of insulating material is attached to a relatively thin static portion of a gas turbine engine such that it will expand or contract at a substantially similar rate to that of a relatively more massive rotating structure, for example, a high pressure turbine rotor. By this means the clearances between sealing parts carried by the rotor and its adjacent static structure may be reduced.

An embodiment of the invention will now be more particularly described by way of example only and with reference to the accompanying drawings in which.

Figure 1:
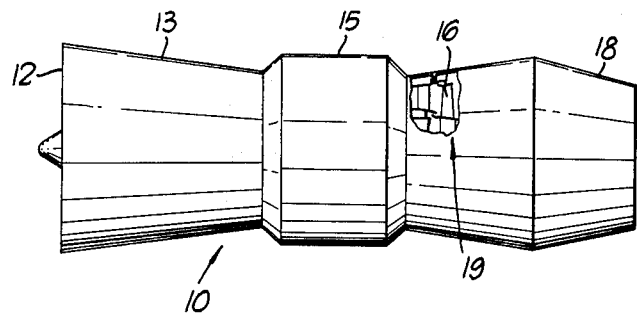
FIG. 1 shows a diagrammatic view of a gas turbine engine illustrated with a cut away casing portion showing a schematic view of an insulating member made in accordance with the present invention.
Figure 3:
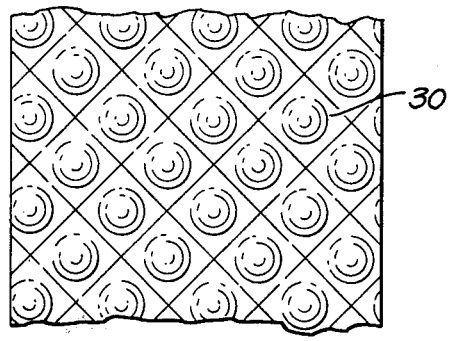
FIG. 3 is a view taken in the direction of arrow shown in FIG. 2 and illustrates the contours of the insulating member.

Referring to FIG. 1 a gas turbine engine shown generally at 10 comprises in flow series, as known per se, an intake 12, a compressor section 13, a combustion section 15, a turbine section 16 and a convergent exhaust nozzle 18. The cut away casing portion of the engine at 19 reveals the turbine of the engine to which the insulation of the present invention is applied.

Figure 2:
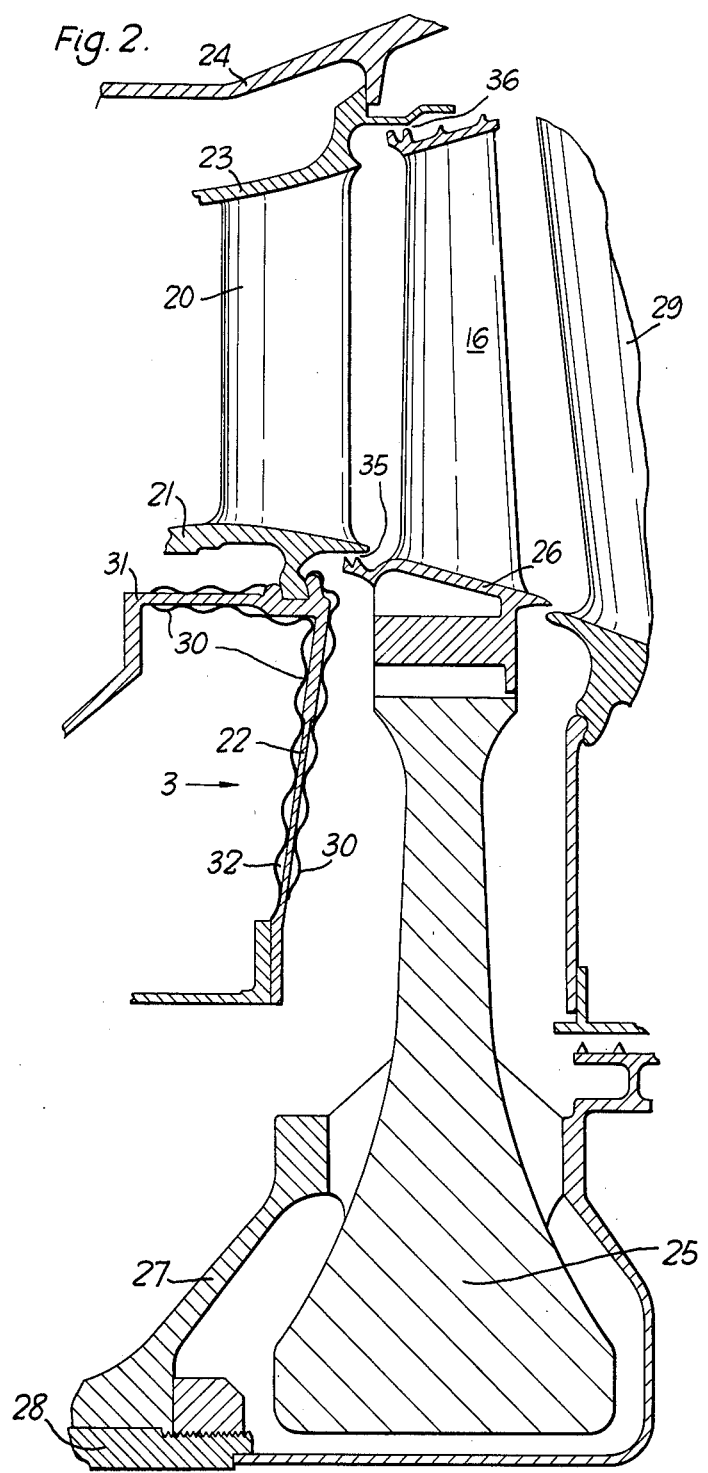
FIG. 2 shows an enlarged view in greater detail of the portion shown schematically at FIG. 1.

FIG. 2 shows in greater detail the turbine of the engine of FIG. 1 which comprises a radially extending array of nozzle guide vanes, one of which is shown at 20. The vanes are secured at their radially innermost ends, by means of platforms 21, to an inner casing which includes an axially extending cylindrical part 31 and a radially extending annular end wall 22. The radially outermost portions of the nozzle guide vanes 20 are provided with platforms 23 which are adapted to be supported from a casing 24 of the engine.

Arranged immediately downstream of the nozzle guide vanes 20 is the turbine rotor comprising a radially extending array of turbine blades one of which is shown at 16, the blades being secured to the high pressure turbine disc 25 through blade roots 26. The turbine disc 25 is rotatably mounted by means of a conical flange 27 which is in turn drivingly connected to the compressor by a shaft a portion of which is shown at 28.

Arranged immediately downstream of the high pressure turbine 16 is a circumferentially extending array of radial stator vanes, a portion of one of which is shown at 29, which are each secured at their radially inner and outer ends to fixed structure.

The rotor blades 16 carry seals 35 and 36 which run with a sealing clearance from adjacent sealing surfaces on the stator vane inner and outer platforms 21 and 23 respectively.

During operation of the engine at different speeds the rotor disc 25 and the adjacent casing walls 22 and 31 are subjected to the same transient temperatures, and since the rotor disc is relatively massive compared with the thinner casing walls, i.e. the rotor disc may be thirty times thicker than the casing, the rate of thermal growth of the disc is slower than that of the casing. Consequently the diameter of the seal 35 carried by the rotor blade 16 changes at a different rate from that of the sealing surface with which it is intended to co-operate, and as a result the sealing clearance between the two has to be made sufficiently large to ensure that the two parts of the seal do not touch under the worst transient case. This means, often, that the sealing clearance is too big for the normal engine cruise condition and leakage of working fluid is excessive.

Figure 4:
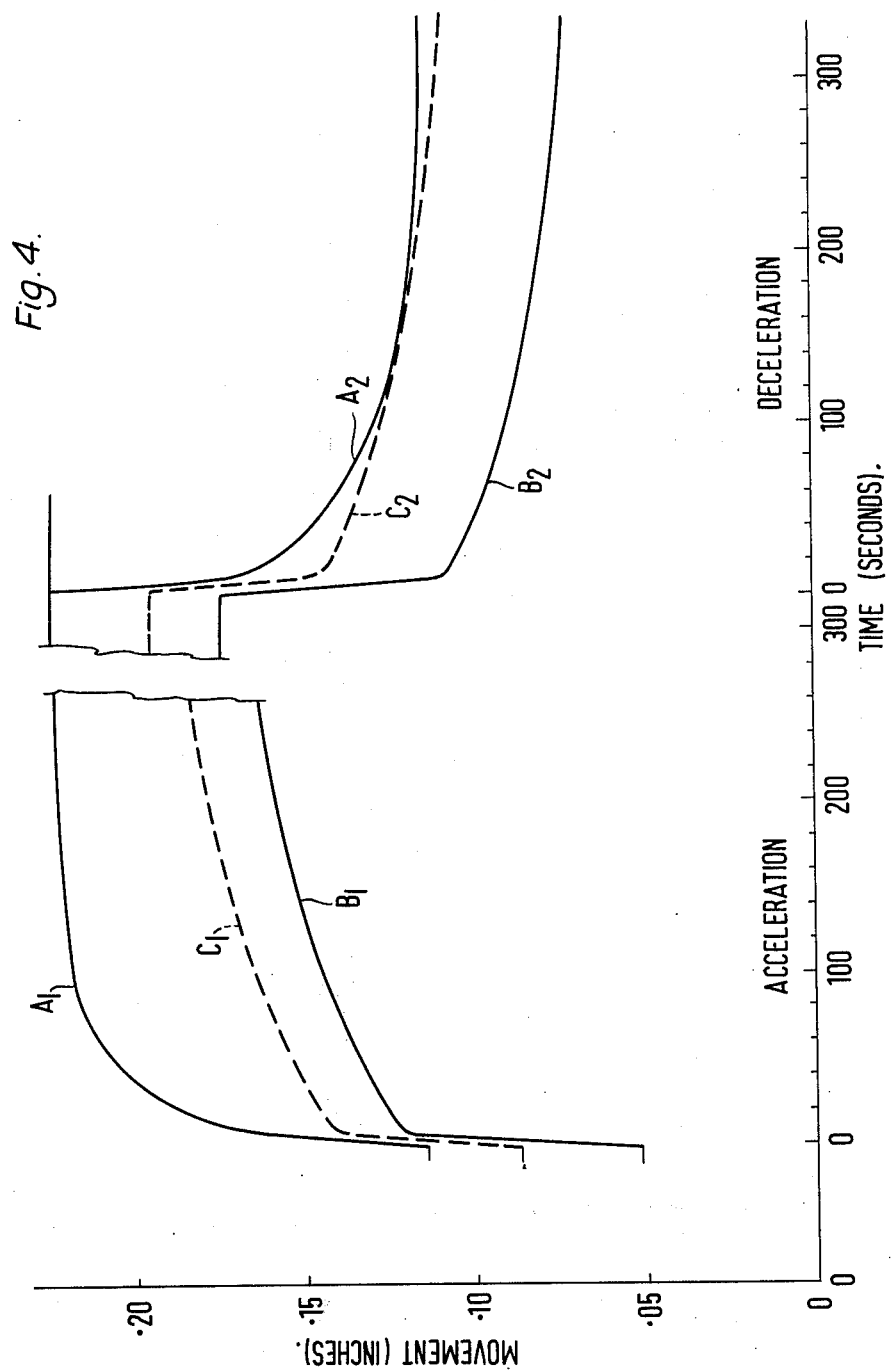
FIG. 4 is a series of graphs showing the relative thermal growths of two engine components before and after the addition of insulation according to the invention.

The full lines of FIG. 4 show how starting with a 0.065 inches clearance in seal 37, the sealing clearance varies during acceleration of the engine from an idling condition to the take-off condition (lines A1 and B1 showing the movement of the platform 23 and the seal 36 respectively), and from take-off conditions back to idling (lines A2 and B2 showing the movement of platform 23 and seal 36 respectively). It can be seen that the distance between lines A2 and B2 reduces to approximately 0.040 inches after 140 seconds of deceleration. The condition would be worse if the engine was decelerated to stop from take-off conditions. By allowing for this reduction in sealing clearance in the initial build of the engine it can be seen from lines A1 and A2 that the result is that the seal clearance opens to 0.075 inches 60 seconds after acceleratin from idling begins.

FIG. 2 shows the application of an insulating member 30 to the casing parts 22 and 31 to reduce this problem.

The insulating member 30 comprises a metallic foil which is dimpled to make it flexible in both directions in the plane of its surfaces, so as to be able to conform to the expansions of the casing to which it is attached. A suitable foil for the applications has been found to be 0.004 inches thick. The whole of the foil is dimpled thus providing adjacent low and high spots on the surface of the foil, some of which are used as connecting points for connecting the foil to the casing surfaces. The foil is connected along radially inner and outer edges by spot welding, and the edge of the foil is flattened to form a seal along these edges for this purpose. Thus the space between the foil and the casing forms a stagnant zone into which air, which acts as the insulating medium is trapped and through which no through current of air can occur. The spot welds at the edges of the member 30 are made as small and as few in number as possible to avoid having too much of the heat conducting area at the radially inner and outer edges of the end wall 22.

Further welds are made in selected positions over the whole surface area of the foil where the high spots on the surface of the insulating foil 30 contact the respective surfaces of the casing to be insulated. The number and areas of these welds are calculated to ensure that heat is transferred to the casing only at a rate which produces a thermal growth of the casing which is substantially the same as the rate growth of the adjacent rotor disc 25. The effect of this is to reduce the changes in clearance at the seals so that smaller initial clearances can be used.

The broken lines C and C2 show how the insulated casing portions move in relation to the rotor and it can clearly be seen that the variations of the sealing clearance A1 - B1 during acceleration, and A2 - B2 during deceleration are reduced, and the lines C1 and C2 closely follow lines B1 and B2 respectively.

FIG. 2 shows the radially outer part of the radial end wall 22 increased in thickness compared to the radially inner part in an attempt to reduce the thickness ratio between the disc 25 and the wall 22. Changing the thickness in this way enables the thermal expansion of the end wall to be further reduced, since the thickened part will control the expansion of the whole end wall, and enables an optimum thermal expansion rate to be achieved in conjunction with the insulation.

Clearly, there is for each case an optimum trade-off between the amount of weight to be added in the engine by thickening the casing part to reduce the thickness ratio between the disc and the casing. Above a thickness ratio of about 30:1, depending, inter alia, on the materials involved and the area of surface to which insulation can be applied, it may not be possible to exactly match the thermal growths by using insulation alone. If, however, the casing is thickened to reduce the ratio to less than say 10:1 there is a weight penalty which may be excessive and offset and advantages of achieving good matching of the thermal growths of the two components.

Thus each case has to be considered in this light and an optimum thickness chosen along with an optimum amount of insulation, and the choice is made either with the aid of calculations which are known to those in the art, or by simple rig testing of different components.

In the test from which FIG. 4 was produced, the area of the contact welds constituted 5 per cent of the area of the insulating foil and air in the space between the insulating foil and the casing was the insulating medium.

It will be readily appreciated that by varying the size of the depressions or cavities within the foil and by suitable choice of welding area and frequency of welding the degree of heat transfer through the foil may be set to a predetermined value.

In order to allow for expansion and contraction of the air in the space between the insulating foil and the casing small breathing holes may be drilled in the foil.

Alternative forms of insulation may be used, for example, the foil may be double skinned and filled with asbestos or other insulating material and attached at discrete points by one of its skins to the surface of an engine component.

We claim:

1. A heat engine having two components of differing thermal masses disposed in the same environment and which expand at different rates, wherein there is provided insulation over an area of at least one surface of the component of lower thermal mass, the size of said area being such in relation to the thermal conductivity of the insulation, the temperature in the environment, and the rate of thermal expansion of the other component, as to allow only sufficient heat conduction between the insulation and said component as is necessary to reduce the rate of thermal expansion and contraction of said component to substantially match that of the other component, the insulation being in the form of a sheet spaced from said component of lower thermal mass but connected to it at its edges to define an enclosed space and being further connected to said component at a plurality of discrete areas distributed over said insulated area, the number and sizes of the discrete areas being such as to define the required heat conducting paths between the insulation and the component.

2. A heat engine as claimed in claim 1 and in which the insulating sheet is dimpled to provide adjacent low and high spots in its surface, the connections to the component being made at the selected high spots which constitute said discrete areas, said space being formed between the component and the low spots in the surface of the insulating sheet.

3. A heat engine as claimed in claim 2 and wherein the insulating sheet is a metal foil and the connections to the component are made by spot welding.

4. A heat engine as claimed in claim 1 and wherein the engine is a gas turbine engine in which the two components support the elements of a gas seal and there is relative rotation between the two components.

5. A heat engine as claimed in claim 1 and in which the insulating sheet is double-skinned and the space between the skins is filled with an insulating material.

6. A heat engine having two components of differing thermal masses disposed in the same environment and which expand at different rates, wherein there is provided insulation over an area of at least one surface of the component of lower thermal mass, the size of said area being such in relation to the thermal conductivity of the insulation, the temperature in the environment and the rate of thermal expansion of the other component as to allow only sufficient heat conduction between the insulation and said component as to reduce the rate of thermal expansion and contraction of said component to substantially match that of the other component, wherein the insulation is in the form of a metal foil sheet spaced from said component of lower thermal mass but connected to it by spot weldings at a plurality of discrete areas distributed over said insulated area, the number and sizes of the discrete areas being such as to define the required heat conducting paths between the insulation and the component, said sheet being dimpled to provide adjacent low and high spots in its surface, the connections to said component being made at selected high spots which constitute said discrete areas, with air spaces formed between the component and the low spots in the surface of the insulating sheet.

7. A heat engine as claimed in claim 6 and in which the insulating sheet is double-skinned and the space between the skins is filled with an insulating material.

* * * * *